June 16, 1964   R. L. STAPLES ETAL   3,137,792
HIGH ENERGY NEUTRON DETECTOR WITH EVACUATED CHAMBER
Filed April 1, 1960
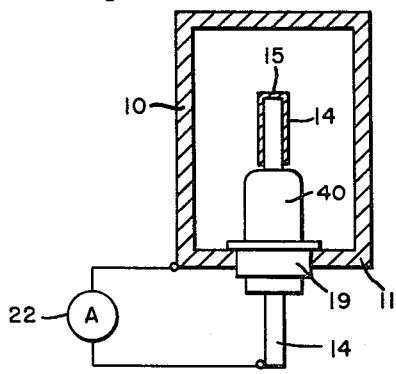
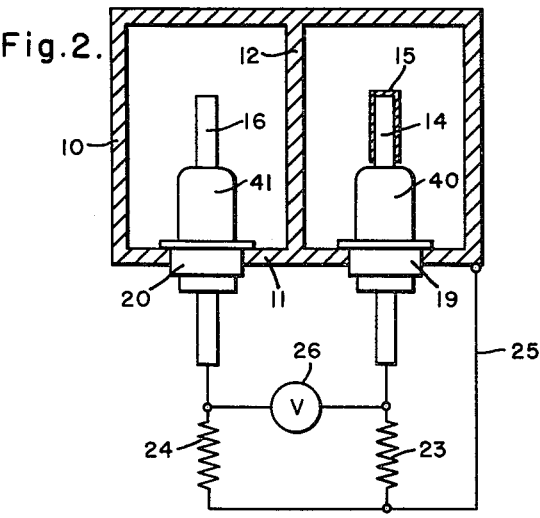
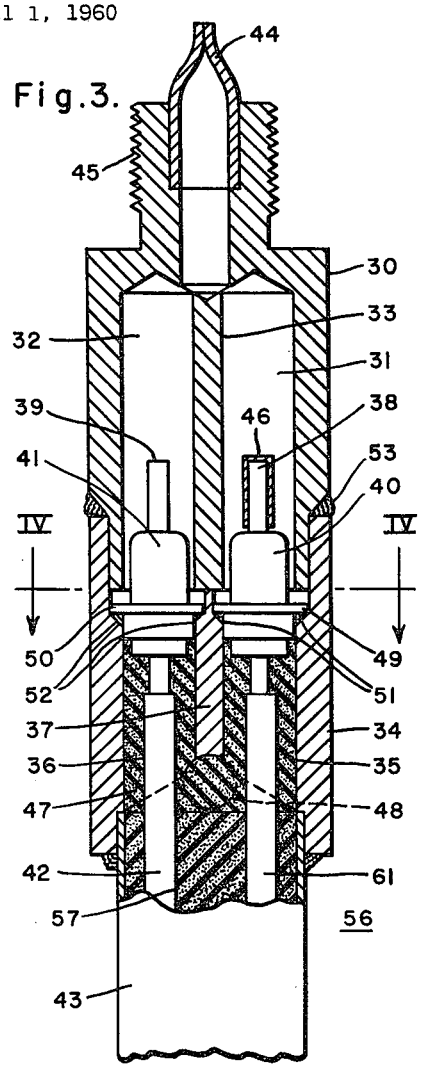
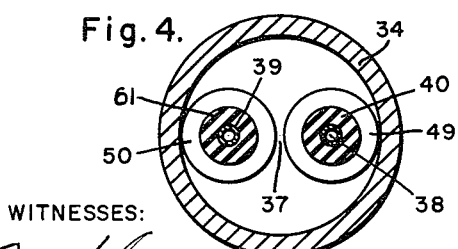
WITNESSES:
Wm. Le Groome
Gordon H. Telfer
INVENTORS
Robert L. Staples, Robert R. Warnken, Jr. &
Charles H. Gleason.
BY
Charles F. Renz
ATTORNEY

United States Patent Office 3,137,792
Patented June 16, 1964

3,137,792
HIGH ENERGY NEUTRON DETECTOR WITH EVACUATED CHAMBER
Robert L. Staples, Horseheads, Robert R. Warnken, Jr., Catlin, and Charles Herbert Gleason, Horseheads, N.Y., assignors to Westinghouse Electric Corporation, East Pittsburgh, Pa., a corporation of Pennsylvania
Filed Apr. 1, 1960, Ser. No. 19,240
3 Claims. (Cl. 250—83.1)

This invention relates generally to radiation detectors and, more particularly, to radiation detectors which are accurately responsive to high radiation flux levels.

Prior art radiation detectors, such as those used to indicate the neutron flux produced by an atomic reactor, generally comprise at least a pair of electrodes having radiation sensitive material coated thereon between which there is disposed an ionizable gas. In other prior art devices, the ionizable gas may itself be the neutron sensitive material. In the case of a neutron sensitive device, impinging neutrons striking the neutron sensitive material cause emission of high energy fragments capable of producing many ions in the gas. A collecting potential applied between the electrodes collects ionized gas atoms and electrons which produce a current in the output circuit related to the incident neutron flux.

The primary objective in prior art devices has been to maximize the output signal from the device. The device may be used as a counter or current indicator. A typical device employs a plurality of concentric cylinders having a neutron sensitive material coated on their surfaces and an ionizable gas therebetween. The gas used may be of a mixture of argon and nitrogen having a pressure of one to three atmospheres. Alternate cylinders are connected for purposes of applying the collecting potential. The total content of neutron sensitive material is of the order of 1000 square centimeters. Fragments having energies of from 3 mev. to 30 mev. are typically emitted from the neutron sensitive material. Since the energy loss by a fragment per collision is about 30 ev., it can be seen that a single fragment can make many collisions with gas atoms before its energy is expended. A desirable design feature of prior devices has been to cause a fragment to have a maximum number of ionizing collisions before losing substantially all its energy after traversing the gaseous volume.

The typical prior art neutron detector was designed primarily for fluxes up to about $10^{10}$ flux units, where one flux unit is one neutron per square centimeter per second. At such flux levels an output current of the order of 1 milliampere is obtained. Assuming linear operation of such a device at high flux levels, about $10^{16}$ flux units, a current would be obtained of the order of 1000 amperes which would impose undesirably severe requirements on the output circuit.

For any given flux level there must be applied across the electrodes of a prior art detector a voltage sufficient to bring the device into its range of linear operation so that a reliable indication of flux may be obtained. This necessary voltage becomes increasingly large as the flux level increases because of the greater number of low energy charged particles to be collected. It is found that for fluxes which exceed $10^{10}$ by a few or more orders of magnitude, the potential necessary to make the device operate in a linear manner is of such magnitude that, if applied across the electrodes, breakdown of the gas would probably occur.

Prior devices generally have high sensitivity, that is the output signal per flux unit of radiation is high. At flux levels up to about $10^{10}$, this is a desirable feature. However, at levels above $10^{13,}$ and particularly above $10^{16}$, a lower sensitivity is preferable for the previously discussed reasons. Some improvement can be obtained by reducing the coating area of the neutron sensitive material to be very small fraction from that which it ordinarily is. For example, a coating area of the order of only ½ square centimeter may be employed as compared with 1000 square centimeters, therefore providing an improvement of about 3 orders of magnitude. This, however, is insufficient where neutron fluxes of the order of $10^{16}$ and above are involved. Masking of the neutron sensitive material to provide an even smaller area to incident radiation is effective in reducing sensitivity somewhat but prevents uniformity of detection of radiation in different directions. Therefore, a new concept is necessary if detectors are to be capable of linear operation with fluxes of the order of $10^{16}$.

High gamma flux levels generally accompany high neutron flux levels, as is the case with atomic reactors. The gamma radiation produces direct ionization of the gas in prior art counters while neutron particles emit fragments from the neutron sensitive material which cause the gas ionization. Another mechanism of ionization is that in which impinging gamma radiation reacts with the walls of the device causing the emission of a beta particle which is capable of direct gas ionization. In discussing the effects of gamma radiation, those actually caused by beta radiation are generally included. According to any of these mechanisms, gas ionization may take place which is indistinguishable from that otherwise produced. Since the relationship between neutron emission and gamma emission may not remain constant over a long period of time, it has long been apparent that some means of distinguishing between a signal produced by neutron bombardment and that produced by gamma radition is necessary. Reduction of the device's neutron sensitivity is desirable for reasons discussed above; if gamma (including beta) sensitivity is not also reduced, an undesirably high gamma response to neutron response ratio will exist. Many different schemes for gamma compensation have been proposed in the prior art. However, when dealing with high flux levels, particularly when gamma response is many times the neutron response of the device, such methods tend to be very inexact.

It is therefore an object of the present invention to provide a radiation detector for use at high radiation flux levels.

Another object is to provide a neutron sensitive device having at low neutron sensitivity for operation at high neutron fluxes.

Another object of the invention is to provide a neutron sensitive device wherein gamma compensation may be achieved easily and accurately, even when the gamma response to neutron response ratio is high.

Another object of the invention is to provide a neutron sensitive device wherein gamma compensation may be achieved easily and accurately even when the incident gamma flux to incident neutron flux ratio is high.

Another object is to provide a neutron detector requireing no collecting potential between electrodes.

Another object is to provide a neutron detector from which a low level current is obtained even at high neutron fluxes.

Another object is to provide a radiation detector which may be easily fabricated without adhering to rigid machine tolerances and which is a compact unit having a low weight.

Another object is to provide a radiation detector having a low impedance output.

According to the present invention a radiation detector is provided having therein a pair of electrodes with an evacuated space therebetween; at least one electrode has radiation sensitive material disposed thereon. According to another feature of the present invention a radiation detector is provided having a pair of evacuated chambers, only one of which has radiation sensitive material therein, and means associated therewith to provide gamma compensation by the difference of the singals from the two chambers.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings, in which:

FIGURE 1 is a sectional view in schematic form of a one chamber device in accordance with the present invention;

FIG. 2 is a sectional view in schematic form of a compensated two chamber radiation detector in accordance with the present invention;

FIG. 3 is a sectional view showing a neutron detector in accordance with the present invention; and FIG. 4 is a sectional view taken along line IV—IV of FIG. 3.

Referring now to FIG. 1, there is shown a metallic envelope 10 having extending through one wall 11 thereof an electrode 14 insulated by an insulating member 40 from the metallic wall 11. The electrode 14, which has a generally cylindrical configuration but may be in any desired shape, has a coating of material 15 thereon which is sensitive to the radiation which the device is to detect. For example, for neutron detection a coating 15 of any of the neutron sensitive isotopes of boron or uranium, such as $B^{10}$ or $U^{235}$, may be disposed on the electrode 14. The electrode 14 and the metallic envelope 10 are part of a circuit which includes an ammeter 22 or any suitable current indicating device disposed between them. The space between the electrode 14 and the metallic enevlope 10 is evacuated, that is, the gas pressure therein has been reduced to a level which is no higher than that obtained in ordinary vacuum tube processing and may, therefore, be of the order of $10^{-4}$ mm. Hg or less. It is to be understood that a lesser vacuum or higher gas pressure, may be employed in instances in which the level of incident flux is not high.

Upon irradiation of the device by neutrons, for example, positive fragments are formed at the coating 15 on the electrode 14 and are emitted therefrom at high speeds. The fragments travel to the metallic wall 10 and appear as a current at the ammeter 22. The lack of a gas fill between the electrodes 10 and 14 permits operation of much higher flux levels as will be more fully explained hereinafter.

Referring now to FIG. 2, there is shown a device having two evacuated chambers enclosed by a metallic envelope 10 such as the one shown in FIG. 1 with electrodes 14 and 16 extending through one wall 11 thereof. One of the electrodes 14 is coated with radiation sensitive material 15 while the other 16 is not. In the external circuit connections are made from the two electrodes 14 and 16 through resistors 23 and 24 to a common lead 25 which connects to the metallic envelope 10. A suitable voltage indicating device 26 is disposed across the leads extending from the two electrodes 14 and 16.

Since only one chamber has neutron sensitive material therein, differing signals will be produced by the two chambers. In the first chamber, which includes electrode 14, a signal due to fragmentary emission caused by neutrons as well as a signal due to beta particles created by impinging gamma radiation will be formed and appear in the output circuit. In the second chamber, which includes electrode 16, the current is due entirely to negatively charged beta particles. Assuming geometrical uniformity between the two chambers, the signals derived from the two chambers will cause different potential drops across substantially equal voltage impedance circuit elements, of which resistors 23 and 24 are exemplary, which potential difference may be measured by the voltmeter 26 as an indication of the neutron flux impinging upon the device. The signals from the two chambers due to gamma or beta radiation will be substantially equal assuming geometrical uniformity and uniform irradiation. The resistors 23 and 24 may be of about 1000 to about 5000 ohms.

If the two chambers in which the electrodes 14 and 16 are contained have some geometrical non-uniformity, simple compensation for this may be achieved by irradiating the device solely with gamma radiation and adjusting the magnitudes of the resistors 23 and 24 so as to indicate a zero output signal from the device 26.

It is desirable, but not essential, that the chambers in which the electrodes 14 and 16 are contained be physically isolated from each other. Since they are both evacuated, there is no difference in pressure to be maintained. The wall 12 which appears in FIG. 2 as a division between the two chambers could in fact be removed without susbtantially impairing the operation of the device but fragments due to neutron radiation would then be able to traverse both chambers with somewhat of a reduction in the device's accuracy.

Referring now to FIG. 3, there is shown a specific embodiment of the present invention in the form a neutron detector. The device comprises a first outer electrode member 30 having a pair of openings 31 and 32 therein separated by a center section 33. The first outer electrode member 30 is sealed to a second outer electrode member 34 also having a pair of apertures 35 and 36 separated by a center section 37. The first and second outer electrode members 30 and 34 together comprise the metallic envelope of the neutron detector. The apertures 35 and 36 are aligned with apertures 31 and 32, respectively. The outer electrode members 30 and 34 may be of a metallic material such as stainless steel, iron, copper or a metallized ceramic. First and second inner electrode members 38 and 39 extend through the apertures and are insulated from the chamber walls by first and second insulating members 40 and 41. The insulating members 40 and 41 are each secured and surrounded by a metallic ring 49 and 50, respectively. The rings 49 and 50 are brazed in a vacuum-tight manner to shoulder portions 51 and 52, respectively, of the second outer electrode member 34 upon which the rings 49 and 50 rest. The first and second outer electrode members 30 and 34 are sealed together by a vacuum-tight braze 53. In its essential structure the first outer electrode member 30 and the volume enclosed thereby is very similar to that shown in FIG. 2. Therefore, it is seen that the volumes enclosed within the first outer electrode member 30 are substantially vacuum-tight.

A twin axial cable member 56 extends up into the second chamber portion which is enclosed by the second outer electrode member 34 and inner cable electrodes 61 and 42 connect with the first and second inner electrodes 38 and 39, respectively. An outer cable electrode 43 connects with the second outer electrode member 34. The cable would be connected to a suitable indicating circuit such as that shown in FIG. 2. The cable 56 is provided with a filling 57 of insulating material such as magnesium oxide.

The portion enclosed by the first outer electrode member 30 is evacuated through a tube 44 which is subsequently sealed off. The first outer electrode member 30 may be provided with a threaded portion 45 onto which a threaded cap (not shown) may be screwed to protect the tipoff of the exhaust tube 44. The first inner electrode member 38 has thereon neutron sensitive material 46, such as uranium 235, having a total area of about ¼ square centimeter and an area density of about 2 milligrams per square centimeter.

The diameter of the apertures 31, 32, 35 and 36 is approximately .200 inch and the total device diameter is about .600 inch. The inner electrode members 38 and 39 have a diameter of about 50 mils and are about three sixteenths of an inch long. The second outer electrode member 34 is filled with a powdered insulating material 47, such as aluminum oxide, in order to prevent spurious signals from originating there. The insulating material 47 may be inserted through an aperture 48 in the second outer electrode member 34 which may be subsequently sealed.

Referring now to FIG. 4, there is shown a sectional plan view of the device of FIG. 3. The second outer electrode member 34 is shown having therein apertures through which inner electrodes 38 and 39 extend. The inner electrodes are sealed and insulated from the outer electrode member 34 by means of rings 49 and 50 and insulating spacers 40 and 41, respectively. In fabrication of the device shown in FIGS. 3 and 4, cylindrical metallic members may initially be formed having the external form of the outer electrode members 30 and 34 and then have parallel apertures 31, 32, 35 and 36 bored through them for the placement of the inner electrodes.

According to the present invention, no gas fill is used, no ionization of a gas takes place and the fragments formed by the impinging radiation in the solid electrodes are directly collected by the electrodes and form the indicating currents. Because of this reduction in sensitivity, the device is capable of operating in fluxes in a linear manner up to levels exceeding about $10^{16}$ flux units.

Another advantage of the present invention is that no collecting potential is required between electrodes. Such collecting potentials formerly were of the order of 500 to 3000 volts and were made necessary because of the low energy of the charged particles to be collected. In the present device high energy charged particles are formed and are collected directly without the need of an externally applied field.

The device disclosed in FIG. 3 achieves saturation of the neutron sensitive material even at very high fluxes and, furthermore, provides output currents in the microampere to milliampere range which be readily and conveniently handled in the output circuit. A low impedance output is provided because there is no problem with leakage currents.

It is readily seen that gamma compensation is achieved is a simple manner without necessitating critically dimensioned chambers and without causing the device to be of a high impedance. Furthermore, the ability to use a twin axial cable 56 provides gamma compensation all the way to whatever measuring instrument is used.

While the present invention has been shown in only a few forms, it will be obvious to those skilled in the art that it is not so limited but is susceptible of various changes and modifications without departing from the spirit and scope thereof.

We claim as our invention:

1. A neutron sensitive device comprising a first electrode, a second electrode and a third electrode, an evacuated region between said first and second electrodes and between said first and third electrodes, said first, second and third electrodes each comprising material emissive of charged particles upon bombardment by gamma radiation, one of said second and third electrodes having thereon a layer of material emissive of charged particles upon bombardment by neutron radiation, and circuit means to derive an output signal proportional to the difference of the currents between said first and second electrodes and between said first and third electrodes to determine the intensity of incident neutron radiation.

2. A neutron sensitive device comprising a metallic envelope enclosing an evacuated volume, a metallic wall separating said evacuated volume into two chamber portions, first and second electrodes extending through said metallic envelope into said first and second chamber portions respectively, insulating members insulating said first and second electrodes from said metallic envelope, said first and second electrodes and said metallic envelope each comprising material emissive of charged particles upon bombardment by gamma radiation, one of said first and second electrodes having thereon a layer of material emissive of charged particles upon bombardment by neutron radiation, circuit means comprising first and second voltage impedance circuit elements electrically coupled respectively to said first and second electrodes and electrically coupled in common to said metallic envelope, and voltage indicating means to indicate the difference in the potential drops across said first and second voltage impedance circuit elements to determine the intensity of incident neutron radiation.

3. A neutron detector comprising first and second metallic envelope members having a pair of parallelly aligned and closely spaced apertures extending therethrough, a shoulder portion disposed on the wall of each of said apertures on said second metallic envelope member, an electrode assembly disposed on and sealed to each of said shoulder portions, said electrode assemblies each comprising a substantially cylindrical electrode extending within said aperture substantially parallel to the walls thereof, an insulating member surrounding said electrode and a metallic ring sealed to said shoulder, said first metallic envelope member and said electrode assemblies enclosing in part a volume evacuated to a pressure of about $10^{-4}$ millimeters of mercury or less, said second metallic envelope member and said electrode assemblies enclosing in part a volume filled with powdered insulating and radiation absorbing material, said first and second radiation sensitive chambers being substantially identical except for a layer of neutron sensitive material selected from the group consisting of neutron sensitive boron isotopes and neutron sensitive uranium isotopes disposed on one of said electrodes, a twin axial cable member having a pair of inner electrodes respectively coupled to said first and second electrodes and having an outer electrode electrically coupled and sealed to said second metallic envelope member.

References Cited in the file of this patent

UNITED STATES PATENTS

| 2,481,506 | Gamertsfelder | Sept. 13, 1949 |
| 2,481,964 | Wollan | Sept. 13, 1949 |
| 2,493,935 | Wiegand et al. | Jan. 10, 1950 |
| 2,506,944 | Stauffer et al. | May 9, 1950 |
| 2,564,626 | MacMahon et al. | Aug. 14, 1951 |
| 2,577,106 | Coleman | Dec. 4, 1951 |
| 2,595,622 | Wiegand | May 6, 1952 |
| 2,696,564 | Ohmart | Dec. 7, 1954 |
| 2,728,867 | Wilson | Dec. 27, 1955 |
| 2,756,348 | Schneider | July 24, 1956 |
| 2,760,078 | Youmans | Aug. 21, 1956 |
| 2,845,560 | Curtis | July 29, 1958 |
| 2,852,694 | McCreary | Sept. 16, 1958 |
| 2,854,584 | Youmans | Sept. 30, 1958 |
| 2,993,138 | Scott | July 18, 1961 |
| 3,043,954 | Boyd et al. | July 10, 1962 |
| 3,052,797 | Kronenberg | Sept. 4, 1962 |
| 3,067,329 | Linden | Dec. 4, 1962 |
| 3,101,410 | Ruby et al. | Aug. 20, 1963 |

OTHER REFERENCES

Lapsley: Neutron, Gamma Measurements for In-Pile Power Monitoring, Nucleonics, February 1958, pp. 106–110.